US011243579B2

(12) United States Patent
Liu et al.

(10) Patent No.: US 11,243,579 B2
(45) Date of Patent: Feb. 8, 2022

(54) BIAXIAL HINGE MECHANISM AND ELECTRONIC DEVICE HAVING THE SAME

(71) Applicant: Wistron Corp., New Taipei (TW)

(72) Inventors: Xu Liu, New Taipei (TW); JingYi Cao, New Taipei (TW); Xin Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 212 days.

(21) Appl. No.: 16/794,321

(22) Filed: Feb. 19, 2020

(65) Prior Publication Data
US 2021/0149454 A1    May 20, 2021

(30) Foreign Application Priority Data
Nov. 18, 2019   (CN) .......................... 201911126999.3

(51) Int. Cl.
*G06F 1/16*      (2006.01)
*F16C 11/04*     (2006.01)
(Continued)

(52) U.S. Cl.
CPC .......... *G06F 1/1681* (2013.01); *E05D 3/122* (2013.01); *E05D 3/18* (2013.01); *F16C 11/04* (2013.01);
(Continued)

(58) Field of Classification Search
CPC combination set(s) only.
See application file for complete search history.

(56) References Cited

U.S. PATENT DOCUMENTS

| 7,478,458 B2 * | 1/2009 | Tajima | G06F 1/162 16/327 |
| 8,627,546 B2 * | 1/2014 | Zhang | H04M 1/022 16/368 |

(Continued)

FOREIGN PATENT DOCUMENTS

| CN | 101995909 A | 3/2011 |
| CN | 105468091 A | 4/2016 |

(Continued)

OTHER PUBLICATIONS

Taiwan Patent Office, 108142634, dated Jan. 22, 2021.
China Patent Office, 201911126999.3, dated Sep. 17, 2021.

*Primary Examiner* — Lisa Lea-Edmonds
(74) *Attorney, Agent, or Firm* — Locke Lord LLP; Tim Tingkang Xia, Esq.

(57) ABSTRACT

The disclosure relates to a biaxial hinge mechanism including a positioning plate, a first main shaft, a second main shaft, a cam, and a linkage assembly. The positioning plate has a first through hole and a second through hole. The first main shaft is movably disposed through the first through hole. The second main shaft is rotatably disposed through the second through hole. The cam is fixed on the second main shaft. The linkage assembly is connected to the first main shaft and movable with the cam. When the second main shaft is rotated in a specific direction, the cam pushes the linkage assembly to force the first main shaft to move away from the second through hole so as to increase an axis distance between the first main shaft and the second main shaft. In addition, the disclosure relates to an electronic device having the biaxial hinge mechanism.

10 Claims, 7 Drawing Sheets

(51) Int. Cl.
  *E05D 3/18* (2006.01)
  *E05D 3/12* (2006.01)
(52) U.S. Cl.
  CPC ...... *G06F 1/1616* (2013.01); *E05Y 2900/606* (2013.01)

(56) References Cited

U.S. PATENT DOCUMENTS

| | | | |
|---|---|---|---|
| 9,104,381 B2 * | 8/2015 | Kuramochi | G06F 1/1681 |
| 9,201,464 B2 * | 12/2015 | Uchiyama | G06F 1/1618 |
| 9,540,855 B2 * | 1/2017 | Kato | E05D 11/082 |
| 9,611,683 B2 | 4/2017 | Zhang et al. | |
| 9,714,533 B2 * | 7/2017 | Kuramochi | G06F 1/1618 |
| 9,778,704 B2 * | 10/2017 | Motosugi | G06F 1/1681 |
| 9,811,123 B2 * | 11/2017 | Park | G06F 1/1681 |
| 9,921,613 B2 * | 3/2018 | Kuramochi | G06F 1/1681 |
| 10,000,955 B2 * | 6/2018 | Shang | E05D 3/12 |
| 10,175,729 B2 * | 1/2019 | Kuramochi | G06F 1/1616 |
| 10,281,951 B2 * | 5/2019 | Vic | E05D 11/0054 |
| 10,401,914 B2 * | 9/2019 | Shang | E05D 5/04 |
| 10,852,776 B1 * | 12/2020 | Morrison | G06F 1/1616 |
| 11,093,008 B2 * | 8/2021 | Hallar | G06F 1/1681 |
| 2015/0362958 A1 * | 12/2015 | Shang | E05D 5/04 361/679.58 |
| 2016/0060931 A1 | 3/2016 | Zhang et al. | |
| 2016/0102487 A1 * | 4/2016 | Kuramochi | G06F 1/1666 361/679.27 |
| 2017/0235337 A1 * | 8/2017 | Vic | E05D 11/00 361/679.55 |
| 2017/0351303 A1 * | 12/2017 | Kuramochi | E05D 11/082 |
| 2019/0056768 A1 * | 2/2019 | Lin | E05D 3/12 |

FOREIGN PATENT DOCUMENTS

| | | |
|---|---|---|
| TW | M388822 | 9/2010 |
| TW | M527111 U | 8/2016 |

* cited by examiner

BIAXIAL HINGE MECHANISM AND ELECTRONIC DEVICE HAVING THE SAME

CROSS-REFERENCE TO RELATED APPLICATIONS

This non-provisional application claims priority under 35 U.S.C. § 119(a) on Patent Application No(s). 201911126999.3 filed in China on Nov. 18, 2019, the entire contents of which are hereby incorporated by reference.

TECHNICAL FIELD

The disclosure relates to a hinge, more particularly to a biaxial hinge mechanism and an electronic device having the same.

BACKGROUND

With the development of technology, electronic products, such as smartphones, tablet computers, or notebooks have become an indispensable part of our daily life. For the purposes of being portable and lightweight, most portable electronic products are designed to be foldable. Taking the notebook computer as an example, a typical notebook computer has two main portions, one is the display screen, and the other is the host or base for accommodating computing system, where the display screen and the host are pivotably connected to each other via a hinge mechanism to allow user to open or close the display screen relative to the host.

In addition, in order to pivot the display screen to a larger angle with respect to the host, some notebook computers use a biaxial hinge mechanism that allows the display screen and the host to pivot on different axes so that the display screen and the host both are pivotable in a large angle range. However, the axes of the conventional biaxial hinge mechanism have to be spaced by a large distance to avoid structural interference between the display screen and the host during rotation, and such a large distance causes a large thickness at the side of the notebook computer having the hinge mechanism and thus making the notebook fail the demand for thin appearance. To overcome this issue, some try to change the shapes of the display screen and the host near the hinge mechanism, but which inevitably changes the originally designed appearance.

In short, the usage of the conventional biaxial hinge mechanisms results in an increase in thickness or results in a change in originally designed appearance.

SUMMARY

One embodiment of the disclosure provides a biaxial hinge mechanism including a positioning plate, a first main shaft, a second main shaft, a cam, and a linkage assembly. The positioning plate has a first through hole and a second through hole. The first main shaft is movably disposed through the first through hole. The second main shaft is rotatably disposed through the second through hole. The cam is fixed on the second main shaft. The linkage assembly is connected to the first main shaft and movable with the cam. When the second main shaft is rotated in a specific direction, the cam pushes the linkage assembly to force the first main shaft to move away from the second through hole so as to increase an axis distance between the first main shaft and the second main shaft.

Another embodiment of the disclosure provides an electronic device including a first device body, a second device body, and a biaxial hinge mechanism. The biaxial hinge mechanism includes a positioning plate, a first main shaft, a second main shaft, a cam, and a linkage assembly. The positioning plate has a first through hole and a second through hole. The first main shaft is movably disposed through the first through hole. The first device body is fixed to the first main shaft. The second main shaft is rotatably disposed through the second through hole. The second device body is fixed to the second main shaft. The cam is fixed on the second main shaft. The linkage assembly is connected to the first main shaft and movable with the cam. When the second main shaft is rotated in a specific direction, the cam pushes the linkage assembly to force the first main shaft to move away from the second through hole so as to increase an axis distance between the first main shaft and the second main shaft.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
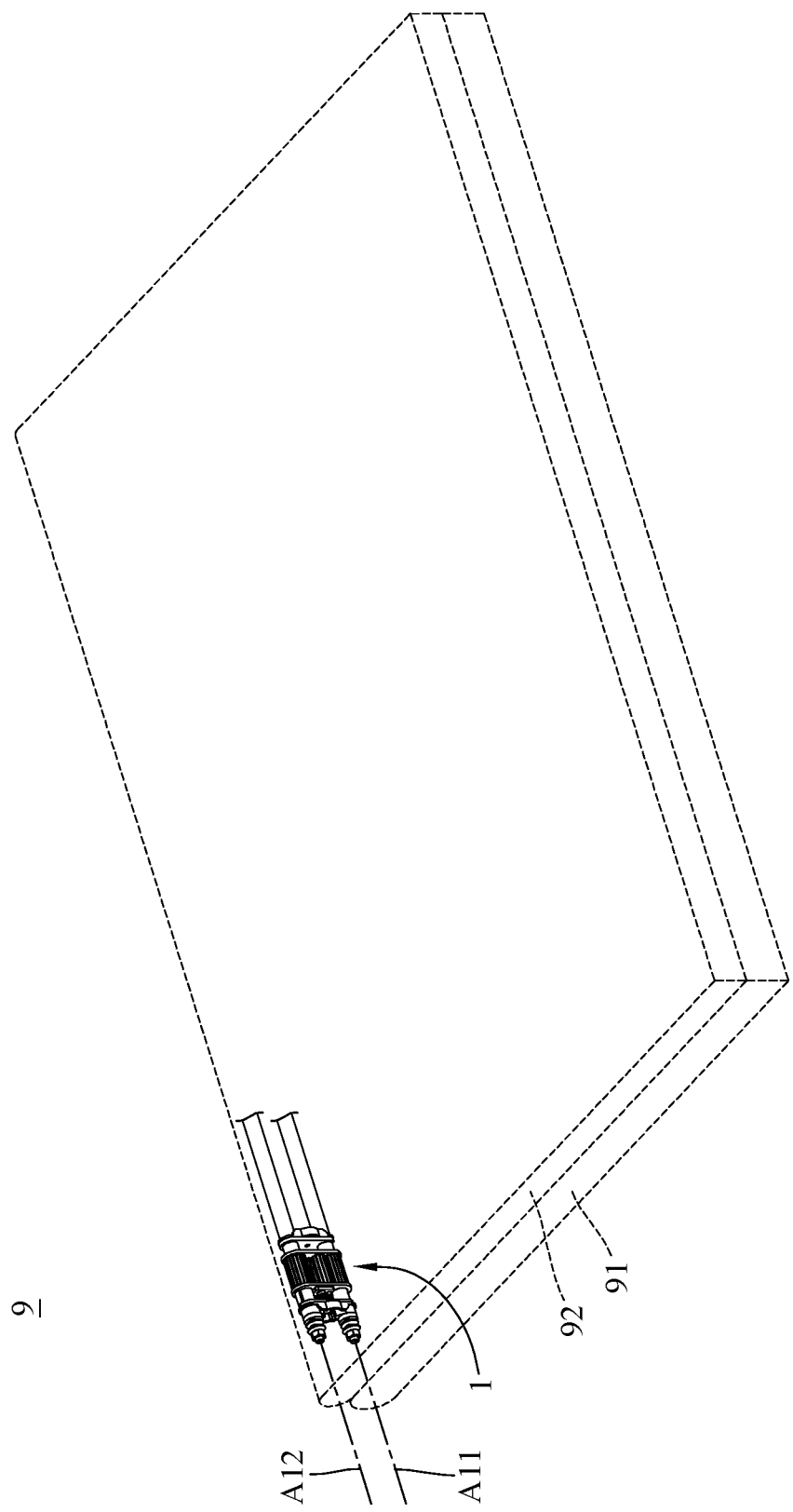
FIG. 1 depicts a biaxial hinge mechanism according to one embodiment of the disclosure being applied to a foldable electronic device.

In the following detailed description, for purposes of explanation, numerous specific details are set forth in order to provide a thorough understanding of the disclosed embodiments. It will be apparent, however, that one or more embodiments may be practiced without these specific details.

In addition, for the purpose of simple illustration, well-known features may be drawn schematically, and some unnecessary details may be omitted from the drawings. And the size or ratio of the features in the drawings of the present disclosure may be exaggerated for illustrative purposes, but the present disclosure is not limited thereto. Note that the actual size and designs of the product manufactured based on the teaching of the present disclosure may also be properly modified according to any actual requirement.

Further, as used herein, the terms "end", "part", "portion" or "area" may be used to describe a technical feature on or between component(s), but the technical feature is not limited by these terms. In addition, unless otherwise specified, the term "substantially", "approximately" or "about" may be used herein to provide an industry-accepted tolerance to its corresponding term without resulting in a change in the basic function of the subject matter at issue.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings.

Firstly, referring to FIG. 1, one embodiment of the disclosure provides a biaxial hinge mechanism 1 and a foldable electronic device 9 having the same. As shown, in this or other embodiments, the electronic device 9 may at least include a first device body 91 and a second device body 92, where the first device body 91 and the second device body 92 are pivotably connected to each other via the biaxial hinge mechanism 1. As such, the first device body 91 and the second device body 92 can be opened or closed through the biaxial hinge mechanism 1. The electronic device 9 may be, but not limited to, a foldable and portable electronic product, such as a notebook computer. In this case, one of the first device body 91 and the second device body 92 may be a display casing, and the other may be a host casing used to accommodate keyboard and computer system, but the disclosure is not limited thereto. In some other embodiments, the electronic device 9 may be another type of device that is also foldable, such as a foldable phone or foldable tablet computer. Note that, according to actual requirements, the electronic device 9 may have more than one biaxial hinge mechanism 1, but the disclosure is not limited thereto. And for the purpose of simple illustration and clear description, FIG. 1 only depicts one biaxial hinge mechanism 1.

In this and other embodiments, the first device body 91 is pivotable with respect to the biaxial hinge mechanism 1 about an axis A11, the second device body 92 is pivotable with respect to the biaxial hinge mechanism 1 about an axis A12, and an axis distance between the axis A11 and the axis A12 can be changed by the biaxial hinge mechanism 1 during the rotational movement of the first device body 91 and/or the second device body 92. In other words, the biaxial hinge mechanism 1 is able to change the distance between the edges that the first device body 91 and the second device body 92 nearby the biaxial hinge mechanism 1.

Figure 2:
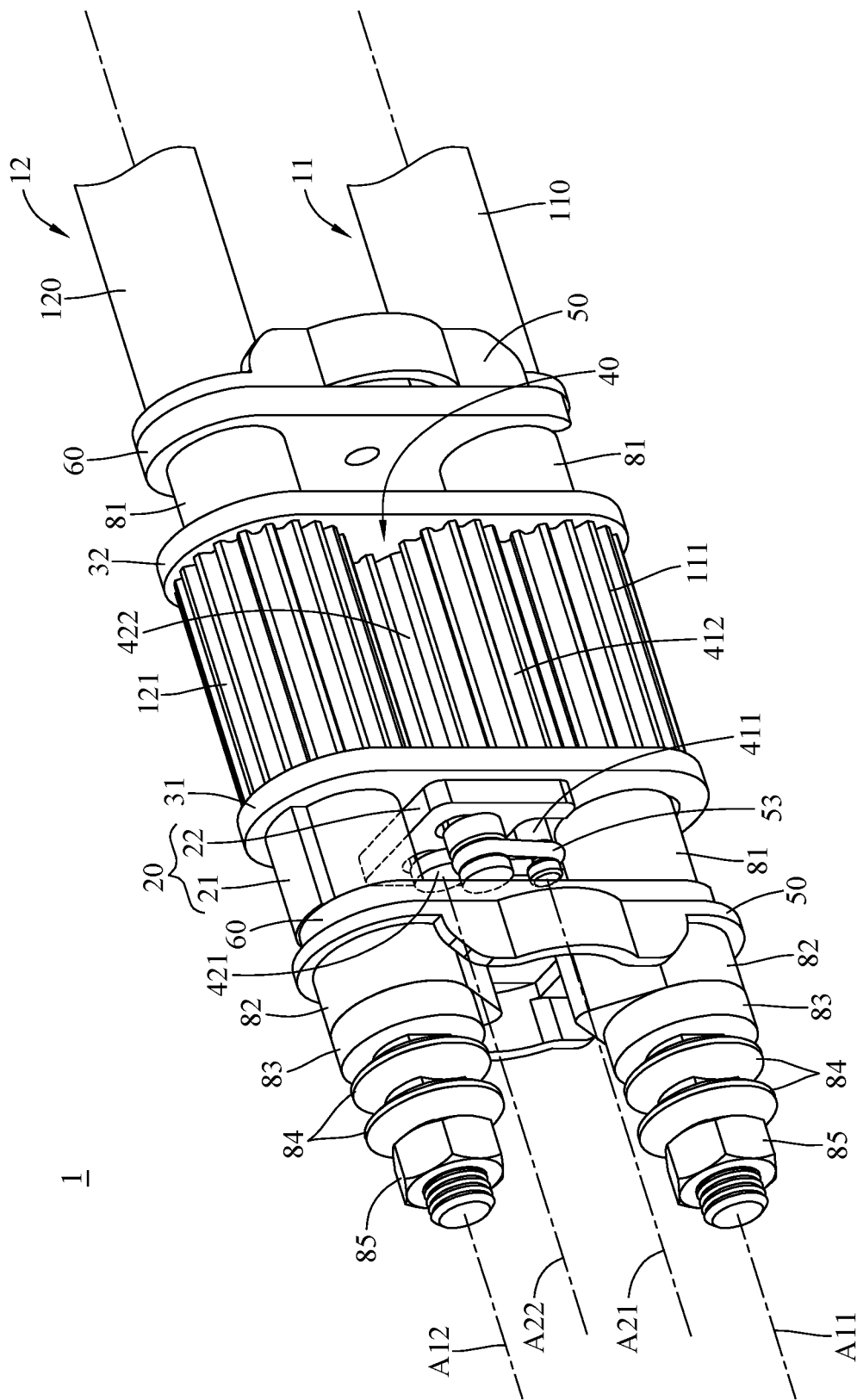
FIG. 2 is a partial enlarged perspective view of the biaxial hinge mechanism in FIG. 1.
Figure 3:
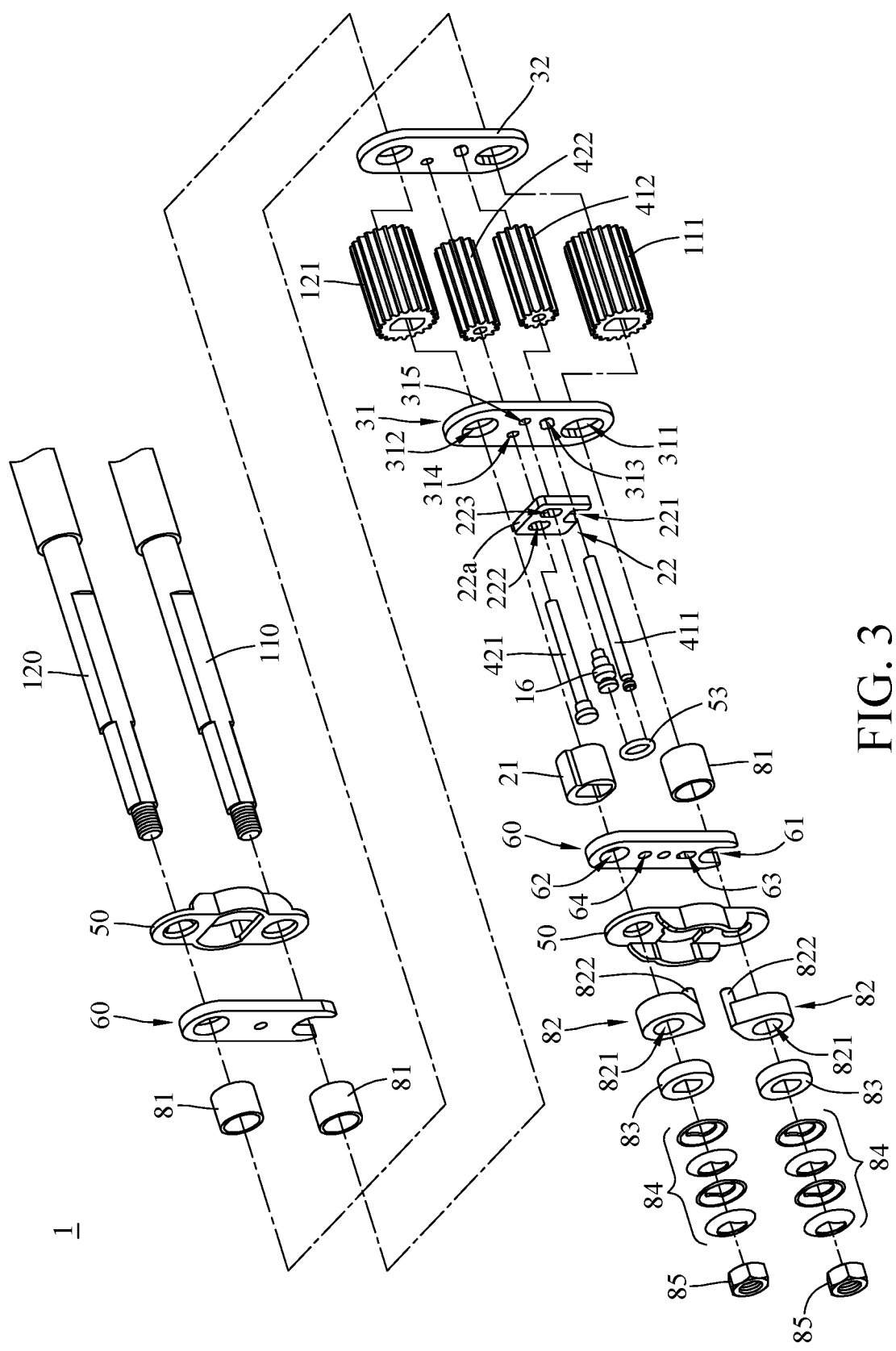
FIG. 3 is an exploded view of the biaxial hinge mechanism in FIG. 2.
Figure 4:
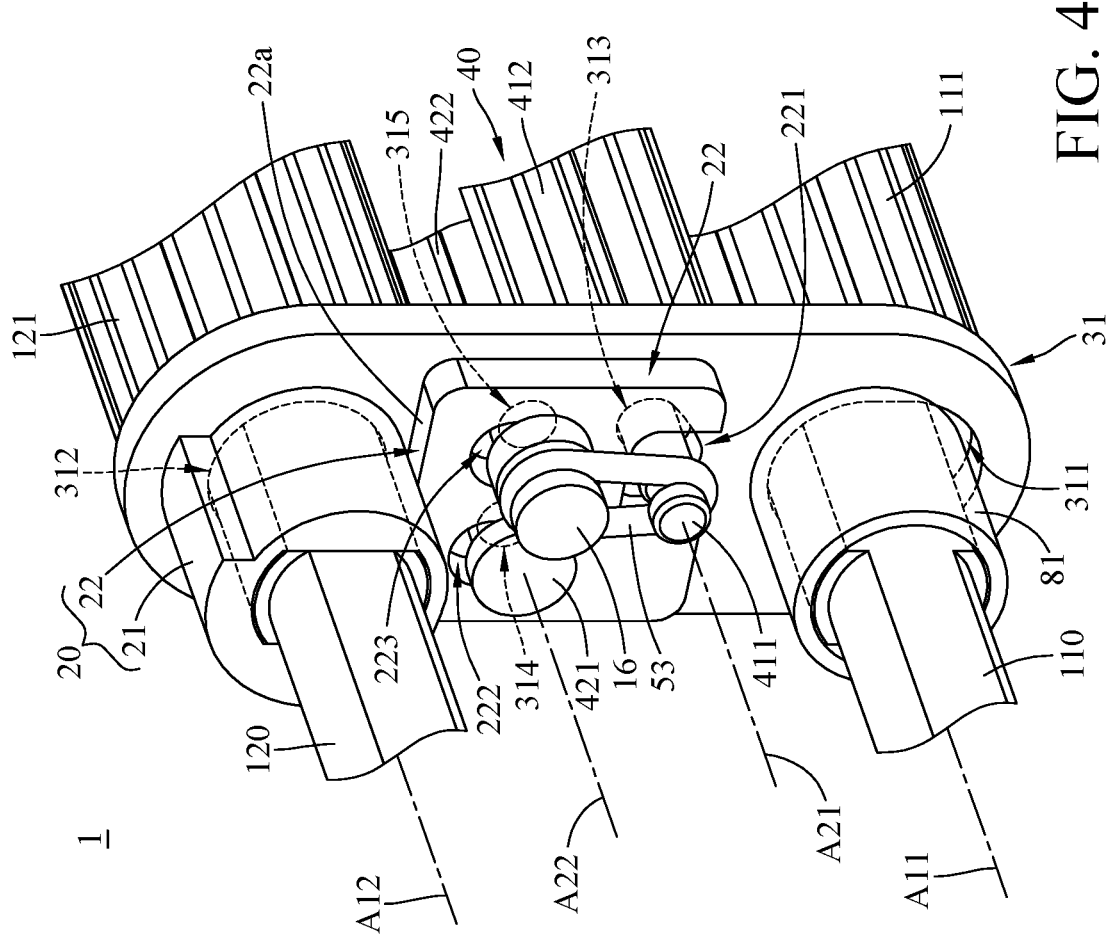
FIG. 4 is a partial enlarged view of the biaxial hinge mechanism in FIG. 2.

In detail, please further refer to FIGS. 2-4, where FIG. 2 is a partial enlarged perspective view of the biaxial hinge mechanism 1 in FIG. 1, FIG. 3 is an exploded view of the biaxial hinge mechanism 1 in FIG. 2, and FIG. 4 is a partial enlarged view of the biaxial hinge mechanism 1 in FIG. 2. For the purpose of simple illustration, the electronic device 9 is omitted from these figures.

In this embodiment, the biaxial hinge mechanism 1 may at least include a first main shaft 11, a second main shaft 12, an axis-distance adjusting member 20, and a linkage assembly 40. The second main shaft 12 and the first main shaft 11 are arranged substantially parallel to each other. Part of the axis-distance adjusting member 20 is fixed on the second main shaft 12 and the axis-distance adjusting member 20 is movable by the rotational movement of the second main shaft 12. The axis-distance adjusting member 20 is able to push the linkage assembly 40 and therefore force the first main shaft 11 to move away from the second main shaft 12.

In detail, the first main shaft 11 may include a first shaft body 110. The first shaft body 110 is rotatably about the axis A11. The first device body 91 of the aforementioned electronic device 9 is disposed on the first shaft body 110 so that the first device body 91 and the first main shaft 11 are rotatable about the axis A11 together. For this reason, in the following paragraphs, the rotational movement of the first main shaft 11 or the first shaft body 110 may be used to represent the movement of the first device body 91 of the electronic device 9.

The second main shaft 12 may include a second shaft body 120. The second shaft body 120 is rotatably about the axis A12. The second device body 92 of the aforementioned electronic device 9 is disposed on the second shaft body 120, so that the second device body 92 and the second main shaft 12 are rotatable about the axis A12 together. For this reason, in the following paragraphs, the rotational movement of the second main shaft 12 or the second shaft body 120 may be used to represent the movement of the second device body 92 of the electronic device 9.

Figure 6:
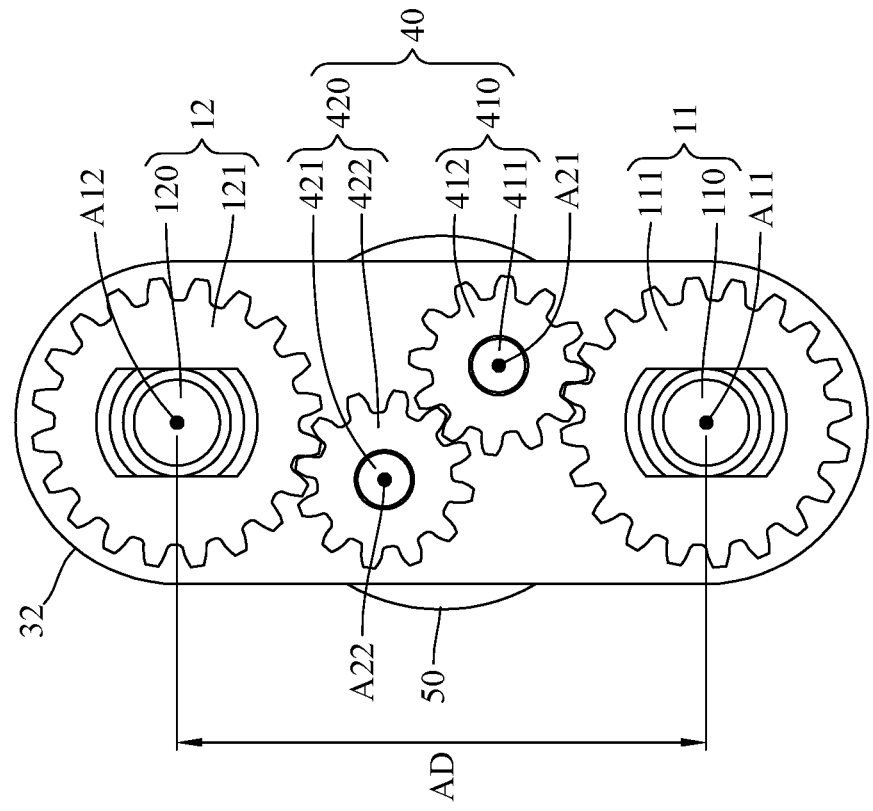
FIG. 6 is a side view of the linkage assembly in FIG. 2.

The linkage assembly 40 is connected to the first shaft body 110 of the first main shaft 11 and the second shaft body 120 of the second main shaft 12 and therefore can transfer the movement from one of the first main shaft 11 and the second main shaft 12 to the other, such that the first main shaft 11 and the second main shaft 12 can be rotated at the same time. Specifically, in this embodiment, the first main shaft 11 may further include a first gear 111, the second main shaft 12 may further include a second gear 121, the linkage assembly 40 may include a first rod 411, a third gear 412, a second rod 421, and a fourth gear 422, wherein the first gear 111, the second gear 121, the third gear 412, and the fourth gear 422 are, but not limited to four gears engagable with each other and therefore construct a simple gear train. In addition, as shown in FIG. 6 described in later paragraphs, the first rod 411 and the third gear 412 together form a first linkage member 410, and the second rod 421 and the fourth gear 422 together form a second linkage member 420.

The first gear 111 is disposed on the first shaft body 110 so that it is rotatable with the first shaft body 110 about the axis A11; and the second gear 121 is disposed on the second shaft body 120 so that it is rotatable with the second shaft body 120 about the axis A12. The first rod 411 and the second rod 421 are located between the first main shaft 11 and the second main shaft 12. The third gear 412 is disposed on the first rod 411 and is engaged with the first gear 111, and the fourth gear 422 is disposed on the second rod 421 and is engaged with the third gear 412 and the second gear 121.

In such an arrangement, the rotation of one of the first main shaft 11 and the second main shaft 12 can simultaneously force the other to rotate via the transmission of the linkage assembly 40. And during the transmission, the third gear 412 is rotated about the axis A21 of the first rod 411, and the fourth gear 422 is rotated about the axis A22 of the second rod 421. Note that, while the electronic device 9 is being opened or unfolded, the third gear 412 is forced to move in a short curved path with respect to the axis A22 of the second rod 421 and thus moving relatively away from the second gear 121 disposed on the second shaft body 120.

Figure 5:
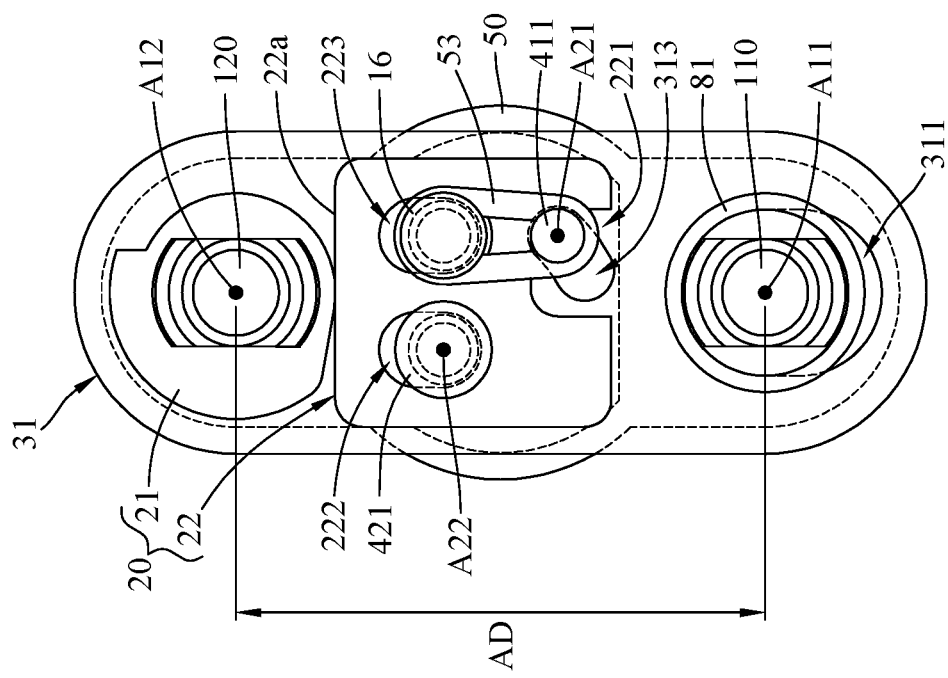
FIG. 5 is a side view of the biaxial hinge mechanism in FIG. 2.
Figure 7:
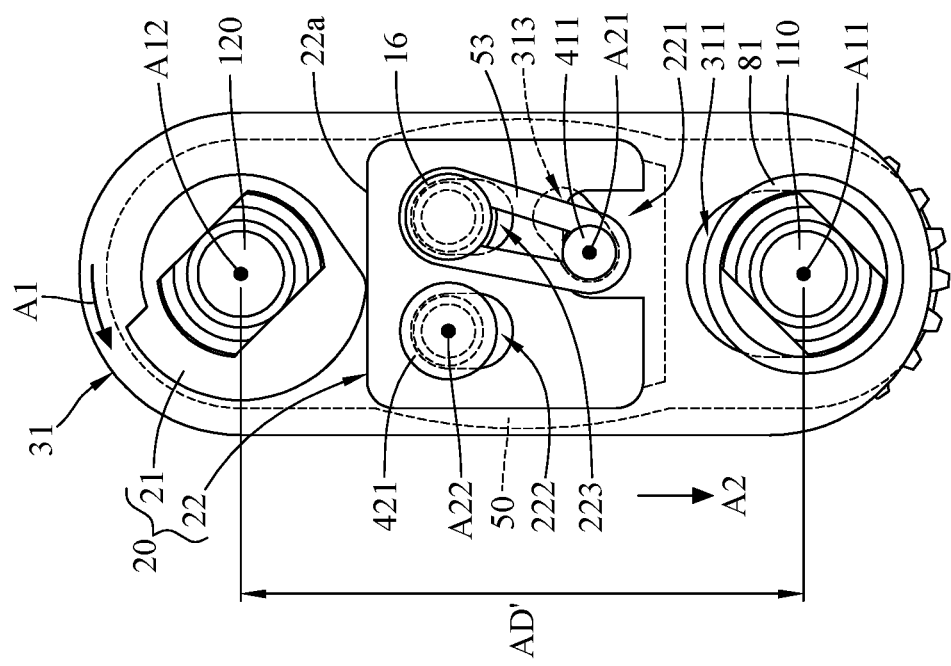
FIG. 7 depicts a side view of the biaxial hinge mechanism as the electronic device in FIG. 1 is being opened.

In this or other embodiments, the movement of the second main shaft 12 can switch the axis-distance adjusting member 20 between an original status (as shown in FIG. 5 described in later paragraphs) and an axis-distance increased status (as shown in FIG. 7 described in later paragraphs). Specifically, in this embodiment, the axis-distance adjusting member 20 includes, for example, a cam 21 and a slidable block 22 which may be movable with each other. The cam 21 is fixed on the second main shaft 12 so that the cam 21 is rotatable with the second main shaft 12 about the axis A12. Herein, the cam 21 is movable between a non-activated position (as shown in FIG. 5 described in later paragraphs) and an activated position (as shown in FIG. 7 described in later paragraphs). The slidable block 22 is slidable and may be in contact with the cam 21; specifically, the slidable block 22 is located at a side of the cam 21 and is movable towards or away from the second main shaft 12 and therefore switchable between a first position (as shown in FIG. 5 described in later paragraphs) and a second position (as shown in FIG. 7 described in later paragraphs).

The cam 21 has a variation in diameter, thus, during the rotation of the cam 21 from the non-activated position to the activated position about the axis A12, the cam 21 can push the slidable block 22 to the second position from the first position and force the slidable block 22 to push the first rod 411 so as to move the third gear 412 in a direction away from the second main shaft 12. As a result, the movement of the cam 21 (i.e., the process that the axis-distance adjusting member 20 switches between the original status and the axis-distance increased status) can change the axis distance between the first main shaft 11 and the second main shaft 12. However, the diameter variation of the cam 21 is not particularly restricted and may be modified according to actual requirements.

More specifically, in this or other embodiments, the biaxial hinge mechanism 1 may further include a first positioning plate 31, wherein the first positioning plate 31 may have a first through hole 311, a second through hole 312, a first installation through hole 313, and a second installation through hole 314. The first through hole 311 and the second through hole 312 are respectively located near two opposite ends of the first positioning plate 31. The first through hole 311 is configured for the insertion of the first shaft body 110 of the first main shaft 11, and the first through hole 311 is, but not limited to a hole substantially extending in a direction from the axis A12 to the axis A11, such that the first main shaft 11 is slidable towards or away from the second through hole 312 along the first through hole 311. The second through hole 312 is configured for the insertion of the second shaft body 120 of the second rod 421. The second through hole 312 is, but not limited to be a round hole.

The first installation through hole 313 and the second installation through hole 314 are substantially located between the first through hole 311 and the second through hole 312. The first installation through hole 313 is configured for the insertion of the first rod 411, and the first installation through hole 313 is, but not limited to a curved hole, such that the first rod 411 is rotatably located in the first installation through hole 313 and is slidable along the first installation through hole 313 in a curved path. The second installation through hole 314 is configured for the insertion of the second rod 421, and the second installation through hole 314 is, but not limited to a round hole. Herein, the curvature center of the first installation through hole 313 is substantially located in the second installation through hole 314, such that the third gear 412 slidable in the first installation through hole 313 can revolve around the axis (i.e., the axis A22) of the fourth gear 422 in a short distance.

The slidable block 22 is slidably located on the first positioning plate 31. In more detail, in this embodiment, the slidable block 22 may have a U-shaped opening 221, a first through slot 222, and an engaging surface 22a. The U-shaped opening 221 is formed at a side of the slidable block 22 away from the cam 21, and the U-shaped opening 221 corresponds to the first installation through hole 313 of the first positioning plate 31 and is configured for the insertion of the first rod 411; in other words, the slidable block 22 is removably placed on the first rod 411 via the U-shaped opening 221. Therefore, the slidable block 22 is movably located on the first positioning plate 31 and movable towards or away from the first main shaft 11.

The first through slot 222 corresponds to the second installation through hole 314 of the first positioning plate 31 and is configured for the insertion of the second rod 421, where the first through slot 222 is, but not limited to a hole substantially extending in a direction from the axis A12 to the axis A11, such that the movement (e.g., the movement on the first positioning plate 31 towards or away from the first main shaft 11 or the second main shaft 12) of the slidable block 22 can be restricted and guided by the second rod 421. The engaging surface 22a is located on a side of the slidable block 22 facing towards the cam 21 and is configured to engage with the cam 21.

In addition, in this or other embodiments, the biaxial hinge mechanism 1 may further include a pin 16, the first positioning plate 31 may further have an insertion hole 315, and the slidable block 22 may further have a second through slot 223. The insertion hole 315 of the first positioning plate 31 is substantially located at a side of the first installation through hole 313 away from the first main shaft 11 and is configured for the insertion of the pin 16. The second through slot 223 of the slidable block 22 is substantially located at a side of the U-shaped opening 221 away from the first main shaft 11. The second through slot 223 corresponds to the insertion hole 315 of the first positioning plate 31 and is configured for the insertion of the pin 16. The second through slot 223 is, but not limited to a hole substantially extending in a direction from the axis A12 to the axis A11, such that the movement (e.g., the movement on the first positioning plate 31 towards or away from the first main shaft 11 or the second main shaft 12) of the slidable block 22 can be restricted and guided by the pin 16. Due to the arrangement that the first rod 411, the second rod 421, and the pin 16 are inserted into the slidable block 22, the slidable block 22 can be positioned in the predetermined path.

Note that the configuration of the pin 16 and its mating structures are not particularly restricted and may be optional. For example, in some other embodiments, the biaxial hinge mechanism may not have the aforementioned pin 16 and the associated holes for installing the pin 16; in such a case, the slidable block may be slidably fixed on the positioning plate via a rail-groove arrangement.

In addition, in this or other embodiments, the biaxial hinge mechanism 1 may further include at least one elastic retaining component 50. The elastic retaining component 50 is substantially in an oval shape and is made of elastic material, such as rubber or steel. The elastic retaining component 50 is sleeved on the first main shaft 11 and the second main shaft 12 and constantly applies an elastic force for forcing the first main shaft 11 and the second main shaft 12 to move towards each other, such that the elastic retaining component 50 can assist moving the first main shaft 11 and the second main shaft 12 back to their original positions and also can constantly maintain the relative position of the gears of the gear train to stabilize their engagement.

Further, in this or other embodiments, the biaxial hinge mechanism 1 may further include an elastic ring 53. The elastic ring 53 is substantially in a ring shape and is made of elastic material, such as rubber. The elastic ring 53 is sleeved on the pin 16 and the first rod 411 and constantly applies an elastic force for forcing the pin 16 and the first rod 411 to move towards each other, such that the elastic ring 53 can assist moving the third gear 412 to back to its original position and also can constantly maintain the engagement of the third gear 412 with the adjacent gears.

In addition, in this or other embodiments, the biaxial hinge mechanism 1 may further include at least one positioning frame 60 and a plurality of spacers 82, for keeping the aforementioned components in their predetermined positions. Specifically, the positioning frame 60 may have a U-shaped opening 61, a through hole 62, a first positioning insertion hole 63, and a second positioning insertion hole 64, and the spacer 82 may have a through hole 821 and a protrusion 822. The U-shaped opening 61 and the through hole 62 are respectively located near two opposite ends of the positioning frame 60, wherein the positioning frame 60 is removably placed on the first shaft body 110 of the first main shaft 11 via the U-shaped opening 61. The through hole 62 is, but not limited to a round hole. The through hole 62 is configured for the insertion of the second shaft body 120 of the second main shaft 12. The first positioning insertion hole 63 and the second positioning insertion hole 64 are substantially located between the U-shaped opening 61 and the through hole 62. The first positioning insertion hole 63 is, but not limited to a hole substantially extending in a direction from the axis A12 to the axis A11, and the second positioning insertion hole 64 is, but not limited to a round hole.

The through hole 821 of one of the spacers 82 is configured for the insertion of the first shaft body 110 of the first main shaft 11, and its protrusion 822 is slidably inserted into the first positioning insertion hole 63 of the positioning frame 60; the through hole 821 of the other spacer 82 is configured for the insertion of the second rod 421, and its protrusion 822 is inserted into the second positioning insertion hole 64 of the positioning frame 60. As such, the spacers 82 and the positioning frame 60 are able to clamp one of the elastic retaining components 50 in between to stabilize the position of the elastic retaining component 50. Also, due to the cooperation of the protrusion 822 of the spacer 82 and the first positioning insertion hole 63 of the positioning frame 60, the minimum axis distance between the first main shaft 11 and the second main shaft 12 is limited and defined by the first positioning insertion hole 63 of the positioning frame 60. On the other hand, when the first main shaft 11 and the second main shaft 12 are moved away from each other, the first positioning insertion hole 63 of the positioning frame 60 can guide and limit the movable range of the spacer 82 that is disposed on the first main shaft 11 so as to stabilize and guide the movement of the first main shaft 11 with respect to the second main shaft 12.

However, the positioning frames 60 and the spacers 82 may be optional. For example, in some other embodiments, the biaxial hinge mechanism may not have the aforementioned positioning frames 60 and spacers 82; in such a case, the components on the first main shaft and the second main shaft can be fixed in position by being placed at the positioning recesses on the first and second main shafts.

Furthermore, according to actual requirements, in this or other embodiments, the biaxial hinge mechanism 1 may further include a second positioning plate 32, a plurality of sleeves 81, a plurality of gaskets 83, a plurality of elastic pieces 84, and a plurality of nuts 85.

The second positioning plate 32 may have a design substantially similar to that of the first positioning plate 31, except for that the second positioning plate 32 does not have the first installation through hole 313 being used for the insertion of the pin 16. The second positioning plate 32 is disposed at the side of the linkage assembly 40 opposite to the first positioning plate 31, such that the linkage assembly 40 is restricted in the space between the first positioning plate 31 and the second positioning plate 32, and which helps position the linkage assembly 40. However, the second positioning plate 32 may be optional. For example, in some other embodiments, the biaxial hinge mechanism may not have the second positioning plate 32; in such a case, the first shaft body of the first main shaft and the second shaft body of the second main shaft may have positioning recessed for positioning the first gear 111 and the second gear 121.

The sleeves 81 are respectively sleeved on the first shaft body 110 of the first main shaft 11 and the second shaft body 120 of the second main shaft 12 in order to space the components on the first main shaft 11 and the second main shaft 12, such as the positioning frame 60 and the first positioning plate 31 and the positioning frame 60 and the second positioning plate 32, by a predetermined distance. However, the disclosure is not limited by the sleeve 81. For example, in some other embodiments, the biaxial hinge mechanism may not have the sleeves 81.

The gaskets 83 and the elastic pieces 84 are sleeved on the first shaft body 110 of the first main shaft 11 and the second shaft body 120 of the second main shaft 12, and the nuts 85 are screwed on the ends of the first shaft body 110 of the first main shaft 11 and the ends of the second shaft body 120 of the second main shaft 12 and thus clamping the gaskets 83 and the elastic pieces 84 between the nuts 85 and other components (e.g., the spacers 82). The gaskets 83 can space the adjacent components by a specific distance and may be made of elastic material, such as rubber. The elastic pieces 84 may be made of elastic material, such as metal or rubber. Therefore, as the nuts 85 are tightened towards the gaskets 83 and the elastic pieces 84, the nuts 85 can force the gaskets 83 and the elastic pieces 84 to deform, and which helps stabilize the relative position of the components on the first main shaft 11 and the second main shaft 12.

However, the disclosure is not restricted by the gaskets 83, the elastic pieces 84, and the nuts 85. For example, in some other embodiments, the biaxial hinge mechanism may not have the gasket 83, the elastic piece 84, and the nut 85.

In addition, note that the fixation of the first shaft body 110, the second shaft body 120, the first rod 411, and the second rod 421 and the fixation of the components thereon are not particularly restricted and may be achieved by tight-fit, adhesive, or being clamped by adjacent components.

Then, please refer to FIGS. 5-8 to introduce the operation of the biaxial hinge mechanism 1. For the purpose of simple illustration and clear description, FIGS. 5-8 may omit some components, and the movement or position of the omitted components may be understood with the reference to the aforementioned figures (e.g., FIGS. 2-4).

Firstly, FIGS. 5-6 show that the status of the biaxial hinge mechanism 1 as the electronic device 9 is in the closed position depicted in FIG. 1, at this moment, the first main shaft 11 in the first through hole 311 of the first positioning plate 31 is located in a position relatively close to the second main shaft 12, and the axis A11 of the first main shaft 11 and the axis A12 of the second main shaft 12 are spaced by an axis distance AD. The cam 21 is currently in the non-activated position, and the cam 21 may be in slight contact with or tight pressing against the engaging surface 22a of the slidable block 22, but the disclosure is not limited thereto. In another embodiment, the cam 21 may be spaced apart from the engaging surface 22a of the slidable block 22 as it is in the non-activated position. Also, the first rod 411 in the first installation through hole 313 of the first positioning plate 31 is in a position relatively close to the second main shaft 12 and is at the close end (not numbered) of the U-shaped opening 221 of the slidable block 22; the second rod 421 in the first through slot 222 of the slidable block 22 is in a position relative away from the second main shaft 12; and the pin 16 in the second through slot 223 of the slidable block 22 is in a position relatively away from the second main shaft 12.

In addition, due to the elastic force that the elastic retaining component 50 applies on the first main shaft 11 and the second main shaft 12 and the elastic force that the elastic ring 53 applies on the first rod 411 and the pin 16, the first gear 111, the second gear 121, the third gear 412, and the fourth gear 422 can be maintained in the current positions via the first shaft body 110, the second shaft body 120, the first rod 411, and the second rod 421, and the slidable block 22 can be maintained in the first position and therefore maintain the cam 21 in the non-activated position. Accordingly, the electronic device 9 can be stably maintained in the current position.

Figure 8:
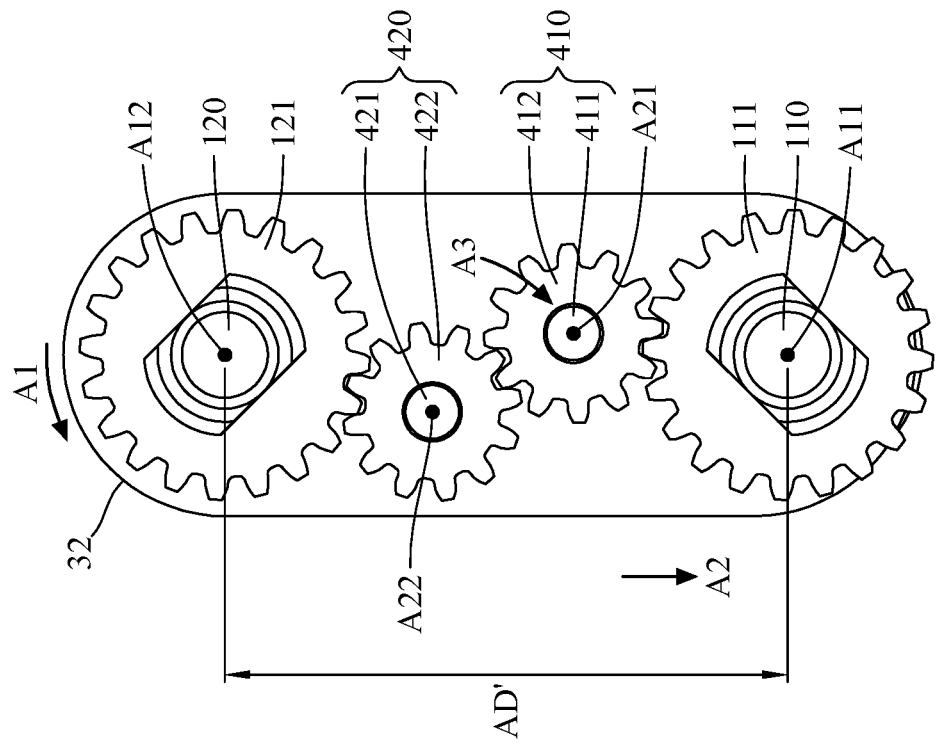
FIG. 8 depicts a side view of the linkage assembly in FIG. 7.

Then, as shown in FIGS. 7-8, the status of the biaxial hinge mechanism 1 is illustrated when the first device body 91 and the second device body 92 are being pivoted to unfold the electronic device 9. Note that the activity of the biaxial hinge mechanism 1 shown in FIGS. 7-8 can be achieved by pivoting the first device body 91 and/or the second device body 92.

During the process, the rotation of the first device body 91 of the electronic device 9 can rotate the first main shaft 11 and the cam 21 on the first main shaft 11 about the axis A12 (as illustrated by the arrow A1), and since the cam 21 has a variation in diameter, the rotation of the cam 21 can push the engaging surface 22a of the slidable block 22 to move the slidable block 22 towards the second position from the first position while rotating from the non-activated position to the activated position, such that the slidable block 22 is moved relatively away from the second main shaft 12 (as illustrated by the arrow A2). And the movement of the slidable block 22 can force the first rod 411 and the third gear 412 on the first rod 411 to move relatively away from the second main shaft 12 (as illustrated by the arrow A3), where the first gear 111 engaged with the third gear 412 is also being forced to move in a direction away from the second main shaft 12 (as illustrated by the arrow A2). As a result, the axis distance AD between the axis A11 of the first main shaft 11 and the axis A12 of the second main shaft 12 is increased to an axis distance AD'. Accordingly, due to the biaxial hinge mechanism 1, the gap between the first device body 91 and the second device body 92 of the electronic device 9 can be increased while the electronic device 9 is being unfolded.

In some embodiments that the electronic device 9 is a notebook, when opening the display casing (e.g., the second device body 92), the biaxial hinge mechanism 1 is able to increase the gap between the edges where the display casing and the host casing are hinged with each other. Therefore, the axis distance between the axes (i.e., the axis A11 of the first main shaft 11 and the axis A12 of the second main shaft 12) of the biaxial hinge mechanism 1 may be designed as a relatively small value as the electronic device 9 is in a closed position, but which does not cause any structural interference between the display casing and the host casing while unfolding the electronic device. As such, the overall thickness of the electronic device 9 may be small as it was originally designed. For the same reason, it is unnecessary to change the original design of the contours of the edges where the display casing and the host casing are hinged with each other to avoid the structural interference during rotational movements. In short, due to the design of the biaxial hinge mechanism 1, the electronic device 9 does not cause any structural interference between the display casing and the host casing while having a desired thickness and an appearance as it was originally designed.

In addition, referring to FIGS. 5-6 and 7-8, during the activity of the linkage assembly 40, the first gear 111 and the second gear 121 are rotated in opposite directions, and the third gear 412 is moved along with and also forced by the fourth gear 422 so that the first rod 411 on the third gear 412 is moved towards a position relatively away from the second main shaft 12 along the first installation through hole 313 of the first positioning plate 31. While the slidable block 22 is moving away from the second main shaft 12, the second rod 421 moves towards the end of the first through slot 222 of the slidable block 22 relatively close to the second main shaft 12, and the pin 16 moves towards the end of the second through slot 223 of the slidable block 22 relatively close to the second main shaft 12. And the first rod 411 and the pin 16 are moved away from each other to stretch the elastic ring 53. The stretched elastic ring 53 stores more elastic energy and helps stabilize and maintain the engagement of the third gear 412 with the adjacent gears.

In addition, the increase of the axis distance between the first main shaft 11 and the second main shaft 12 stretches the elastic retaining component 50. The stretched elastic retaining component 50 stores more elastic energy and helps stabilize and maintain the engagement of the linkage assembly 40 with the first gear 111 and the second gear 121.

However, the elastic retaining component 50 and the elastic ring 53 may be optional and are not intended to limit the disclosure. In some other embodiments, the biaxial hinge mechanism may not have the aforementioned elastic retaining component 50 and elastic ring 53; in such a case, the operation of the biaxial hinge mechanism can be stably achieved in a manual manner.

In addition, referring back to FIG. 3, it is understood that, while the axis distance between the axis A11 of the first main shaft 11 and the axis A12 of the second main shaft 12 is being increased, the first positioning insertion hole 63 of the positioning frame 60 is able to guide and limit the movable range of the spacer 8 disposed on the first main shaft 11 so as to limit the available movable range of the first main shaft 11 with respect to the second main shaft 12. That is, the first positioning insertion hole 63 limits the variation range of the axis distance between the axis A11 of the first main shaft 11 and the axis A12 of the second main shaft 12. In addition, the spacer 82 disposed on the first positioning insertion hole 63 of the positioning frame 60 is able to prevent the first main shaft 11 from falling off from the U-shaped opening 61 of the positioning frame 60.

On the other hand, folding the electronic device 9 can be achieved by reversing the aforementioned steps, such as pivoting the first device body 91 and/or the second device body 92 to return the first main shaft 11, the second main shaft 12, the cam 21, and the linkage assembly 40 to the respective positions shown in FIGS. 5-6. During this process, the elastic energy stored in the elastic retaining component 50 is released to pull the first main shaft 11 and the second main shaft 12 towards each other, making the returning operation effortless and efficient and ensuring the engagements among the gears of the gear train; and the elastic energy stored in the elastic ring 53 is released to pull the first rod 411 towards the pin 16 and to maintain the engagement of the third gear 412 with the adjacent gears.

As discussed above, in this embodiment, the gear train constructed by the first gear 111, the second gear 121, the third gear 412, and the fourth gear 422 is able to transmit the movement between the first main shaft 11 and the second main shaft 12, but the disclosure is not limited thereto; in some other embodiments, these gears may be replaced with the same amount of cylindrical structure having a high coefficient of friction and low wear rate, such as cylindrical rubber. Alternatively, in some other embodiments, the biaxial hinge mechanism may not have the aforementioned second gear 121 and fourth gear 422; in such a case, the axis-distance adjusting member 20 may still be able to force the first main shaft 11 to move away from the second main shaft 12 by pushing the first rod 411 of the linkage assembly 40.

Figure 9:
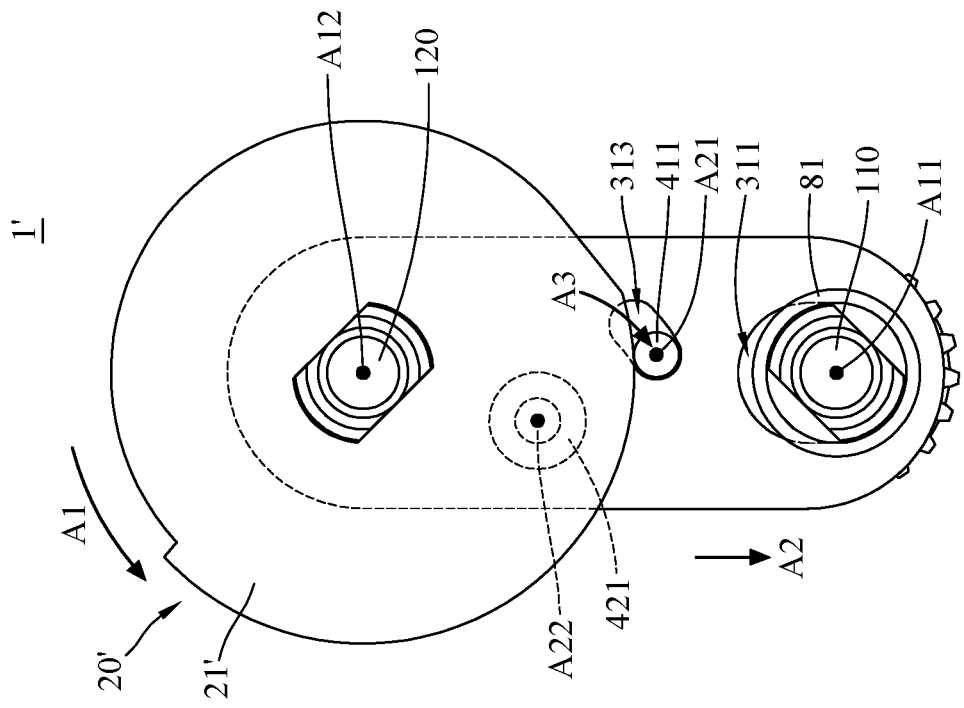
FIGS. 9-10 depict a biaxial hinge mechanism according to another embodiment of the disclosure and its operation.
Figure 10:
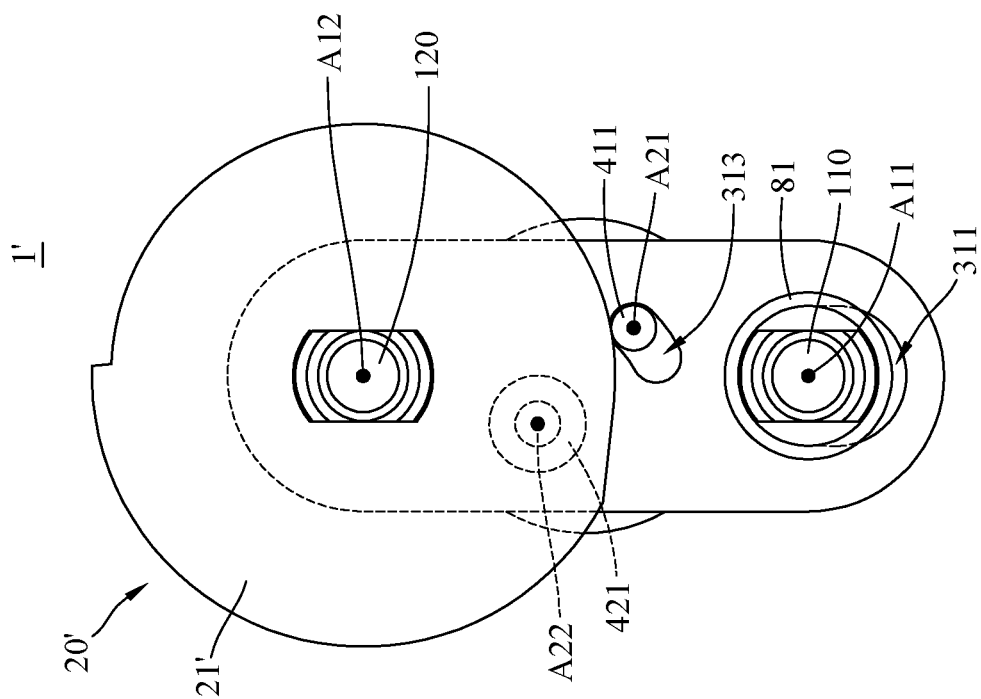

In addition, it is noted that the slidable block 22 may be optional and the slidable block 22 is not intended to limit the disclosure. For example, another embodiment of the disclosure provides a biaxial hinge mechanism 1', and the biaxial hinge mechanism 1' does not have the aforementioned slidable block 22. In detail, referring to FIGS. 9-10, the biaxial hinge mechanism 1' according to another embodiment of the disclosure and its operation are depicted. For the purpose of simple illustration and clear description, FIGS. 9-10 may omit some components. Note that the main differences between this and previous embodiments are the omission of the slidable block 22 and some associated modification of this embodiment, thus only the differences are described below.

In this embodiment, the biaxial hinge mechanism 1' has an axis-distance adjusting member 20' having a cam 21', where the cam 21' is sized and shaped to be constantly in contact with the first rod 411. Therefore, during the rotation of the cam 21' from the non-activated position to the activated position about the axis A12, the cam 21' is able to directly push the first rod 411 in a direction away from the second shaft body 120, thereby pushing the first shaft body 110 away from the second shaft body 120 to increase the axis distance between the first shaft body 110 and the second shaft body 120.

According to the biaxial hinge mechanism and the electronic device having the same as discussed in the above embodiments of the disclosure, the cam fixed on the second main shaft is able to push the linkage assembly to force the first main shaft to move away from the second through hole during the rotation of the second main shaft so as to increase the axis distance between the first main shaft and the second main shaft. Therefore, the gap between the first device body and the second device body of the electronic device having the biaxial hinge mechanism can be increased while the electronic device is being unfolded.

In the example that the electronic device is a notebook computer, the biaxial hinge mechanism is able to increase the gap between the edges where the display casing and the host casing are hinged with each other when opening the display casing. Therefore, the axis distance between the axes of the shafts of the biaxial hinge mechanism may be designed as a relatively small value as the notebook is completely folded, but which does not cause any structural interference between the display casing and the host casing while unfolding the electronic device. As such, the overall thickness of the electronic device may be small as it was originally designed. For the same reason, it is unnecessary to change the original design of the contours of the edges where the display casing and the host casing are hinged with each other to avoid the structural interference during rotational movements. In short, due to the design of the biaxial hinge mechanism, the notebook computer does not cause any structural interference between the display casing and the host casing while having a desired thickness and an appearance as it was originally designed.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A biaxial hinge mechanism, comprising:
   a positioning plate, having a first through hole and a second through hole;
   a first main shaft, movably disposed through the first through hole;
   a second main shaft, rotatably disposed through the second through hole;
   a cam, fixed on the second main shaft; and
   a linkage assembly, connected to the first main shaft and movable with the cam;
   wherein when the second main shaft is rotated in a specific direction, the cam pushes the linkage assembly to force the first main shaft to move away from the second through hole so as to increase an axis distance between the first main shaft and the second main shaft.

2. The biaxial hinge mechanism according to claim 1, further comprising a slidable block, wherein the cam is configured to be in contact with the slidable block so as to push the linkage assembly via the slidable block.

3. The biaxial hinge mechanism according to claim 2, wherein the linkage assembly comprises a first linkage member and a second linkage member, the positioning plate further has a first installation through hole and a second installation through hole, the first linkage member is rotatably and slidably disposed through the first installation through hole, the second linkage member is rotatably disposed through the second installation through hole, the first linkage member is engaged with the first main shaft and the second linkage member, the second linkage member is engaged with the second main shaft, the slidable block is configured to be in contact with the first linkage member and to force the first linkage member to move away from the second main shaft along the first installation through hole.

4. The biaxial hinge mechanism according to claim 3, wherein the first installation through hole of the positioning plate is a curved hole having a curvature center located in the second installation through hole.

5. The biaxial hinge mechanism according to claim 3, wherein the slidable block has a U-shaped opening and a first through slot, the first linkage member is disposed through the U-shaped opening, the second linkage member is disposed through the first through slot, and the slidable block is movable towards or away from the second main shaft on the positioning plate.

6. The biaxial hinge mechanism according to claim 3, further comprising a pin and an elastic ring, wherein the pin is fixed on the positioning plate, the elastic ring is sleeved on the pin and the first linkage member and is configured to force the first linkage member to move towards the second main shaft.

7. The biaxial hinge mechanism according to claim 1, further comprising an elastic retaining component sleeved on the first main shaft and the second main shaft to force the first main shaft to move toward the second main shaft.

8. The biaxial hinge mechanism according to claim 1, further comprising a positioning frame, the positioning frame having a U-shaped opening and a through hole respectively located near two opposite ends of the positioning frame, wherein the first main shaft is slidably disposed through the U-shaped opening, and the second main shaft is disposed through the through hole.

9. The biaxial hinge mechanism according to claim 8, further comprising a spacer, the spacer sleeved on the first main shaft, wherein the spacer has a protrusion, the positioning frame has a first positioning insertion hole, the protrusion of the spacer is slidably located in the first positioning insertion hole and movable towards or away from the second main shaft along the first positioning insertion hole.

10. An electronic device, comprising:
a first device body;
a second device body; and
a biaxial hinge mechanism, comprising:
- a positioning plate, having a first through hole and a second through hole;
- a first main shaft, movably disposed through the first through hole, wherein the first device body is fixed to the first main shaft;
- a second main shaft, rotatably disposed through the second through hole, wherein the second device body is fixed to the second main shaft;
- a cam, fixed on the second main shaft; and
- a linkage assembly, connected to the first main shaft and movable with the cam;
- wherein when the second main shaft is rotated in a specific direction, the cam pushes the linkage assembly to force the first main shaft to move away from the second through hole so as to increase an axis distance between the first main shaft and the second main shaft.

* * * * *